April 1, 1941.  E. C. READ  2,237,114
VALVE
Filed April 29, 1939
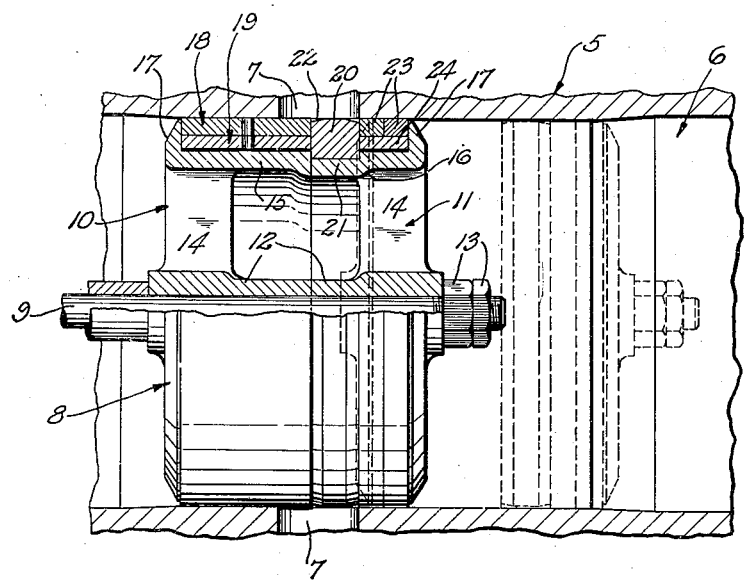
INVENTOR
Everett C. Read
BY John W. Michael
ATTORNEY Patented Apr. 1, 1941

2,237,114

UNITED STATES PATENT OFFICE 2,237,114

VALVE

Everett C. Read, Milwaukee, Wis., assignor to The Filer & Stowell Co., Milwaukee, Wis., a corporation of Wisconsin Application April 29, 1939, Serial No. 270,722

1 Claim. (Cl. 251—75)

This invention relates to an improvement in valves for controlling the supply and exhaust or the distribution of motive fluid to an engine or the like, such as a steam engine.

Valves of the character contemplated by the present invention comprise generally a valve casing having a steam inlet port or a steam exhaust port, or both, which extends through the wall of the valve chamber in which the valve, usually of the piston type, operates. In order to obtain a substantially steam-tight fit between the valve and the wall of its valve chamber the peripheral surface of the valve is usually equipped with one or more sets of piston rings or packing rings. In accordance with the practice heretofore prevalent in the art, these piston rings or packing rings have been of narrow width, in fact their width has always been less than the width of the port or ports in the wall of the valve chamber so that it is necessary to have these ports formed with bridges to prevent the rings from expanding into the port and catching on the edges thereof. As the valve casings are usually castings it is often impractical to form the bridges of the ports integral with the castings and this has led to a rather general use of bushings for the valve chambers, the bridges of the intake and exhaust ports being formed as parts of the bushings.

The present invention proposes to provide a valve of this character with a valve casing having inlet or exhaust ports or both which are continuous and uninterrupted about the entire inner periphery of the valve chamber. This provides a greater port area for any given port height or width than had been heretofore. The valve itself is provided with piston or packing rings which are wider than the valve ports so that in all positions of the valve some portions of the piston or packing ring overlaps the unbroken wall of the valve chamber, thereby retaining the piston or packing ring against expansion into the valve port and precluding the possibility of its edges catching on the edges of the port. This structural organization has the advantage of eliminating the bushings, thereby simplifying the construction and lowering its cost and reducing its wear. The construction lends itself to the provision of a balanced valve, that is, one in which the pressure on the opposite ends of the valve are equalized. And where the invention is embodied in an admission or steam inlet valve, the steam pressure may be utilized to enhance the packing or sealing action of the packing rings.

From the foregoing, it will be seen that the object of the invention is to provide a valve of the character described which eliminates the necessity of employing bushings, thereby reducing the size and weight of the valve and lowering its cost to provide a valve which is more readily controlled and hence minimizes wear and tear on the valve gear and governor system and to provide a valve which is leak proof.

A further object of the invention is to provide a valve having these advantages and capacities and which is simple and durable in its construction, reliable and efficient in operation, and easy and comparatively inexpensive to manufacture, install and maintain.

Other objects and advantages reside in certain novel features of the construction, arrangement and combination of parts which will be hereinafter more fully described and particularly pointed out in the appended claim, reference being had to the accompanying drawing forming a part of this specification, and in which the figure is a fragmentary view partly in longitudinal vertical cross section and partly in side elevation showing the exhaust valve of a steam engine constructed in accordance with the present invention.

In the drawing the invention is shown embodied in an exhaust valve of a steam engine. A fragment of the valve casing is designated at 5 and has a valve chamber 6 formed therein. An exhaust port 7 leading from the cylinder of the engine (not shown) opens into the valve chamber 6. The portion of the exhaust port 7 which opens into the valve chamber 6 may, and preferably does, extend entirely around the inner peripheral wall thereof. The exhaust valve, designated generally at 8, is shown as being a piston type valve and is actuated by a valve rod 9 in the usual way. The body of the valve is made up of two sections, designated at 10 and 11, and although differing in size and differing slightly in some features of design, each has a sleeve-like hub portion 12 fitted on and secured to the valve rod 9 in any suitable way, as for example, by nuts 13. Radial spider arms 14 are integrally formed with the hub sections 12 of the valve body and at their outer ends are integral with the annular shell portions 15 and 16 of the valve body. The annular shell portions 15 and 16 are formed with outwardly directed annular flanges 17 and 18, the confronting faces of which are accurately machined to receive the packing ring arrangement. In this structure the main packing ring is designated at 18 and may be a bronze ring of any conventional construction which is expanded by an expanding ring 19 of cast iron or steel or the like. The rings 18 and 19 are fitted about the shell 15 of the section 10 of the valve body and they are of greater width than the port 7 so that some portion of the ring 18 is always engaged with the unbroken wall of the valve chamber 6 to prevent the ring 18 from expanding into or catching on the corners or edges of the valve port 7.

With this construction it is desirable to employ supplemental rings rather than make the packing ring 18 the only ring embodied in the structure, since to do so would make the ring 18 too wide and impair its effectiveness, due to unequal expansions that sometimes occur in different portions of the valve chamber. It is sufficient to make the ring 18 wider than the valve port 7 and complete the structure by means of a solid spacer ring 20 received in a recess 21 provided in the shell 16 of the section 11 of the valve body. The outer face of the solid ring 20 is rounded or tapered off as indicated at 22 to prevent its catching on the edges of the valve body.

Just beyond the spacer ring 20 two narrow packing rings 23 and one or more expanding rings 24 therefor are provided to seal off the end of the valve with which they are associated. These rings 23 may be made narrower than the port since they never traverse it. The extreme limit of their movement to the left, as viewed in the figure, is that illustrated.

The invention avoids the necessity of employing bridges for the ports or of employing bushings so that the cost of the valve is lowered and its weight is reduced. Where occasion requires the valve is not only equalized but also the steam pressure aids the expanding ring in effecting the seal between the packing rings and the wall of the valve chamber, and these advantages are had in a construction which is simple and durable, reliable and efficient, and easily manufactured and installed.

While I have shown and described one construction in which the invention may be advantageously embodied, it is to be understood that the construction shown has been selected merely for the purpose of illustration or example and that various changes in the size, shape and arrangement of the parts may be made without departing from the spirit of the invention or the scope of the subjoined claim.

The invention claimed is:

An exhaust valve of the character described comprising a casing having a valve chamber and provided with a port extending completely around the inner peripheral wall of the chamber, a piston valve reciprocable in said valve chamber and having a valve body, a packing ring wider than the port and traveling thereacross but having in all positions of the valve a part thereof engaged with an uninterrupted portion of the valve chamber to prevent expansion of the ring to such extent as to make it liable to catch against the corners or edges of the port, a solid spacer ring carried by the valve body and having a rounded off outer surface, and packing rings carried by that portion of the valve body which lies at all times on one side of said port whereby said packing ring may be of such limited length that its effectiveness will not be impaired by virtue of unequal expansions that occur in different portions of the valve chamber.

EVERETT C. READ.